Patented May 23, 1950

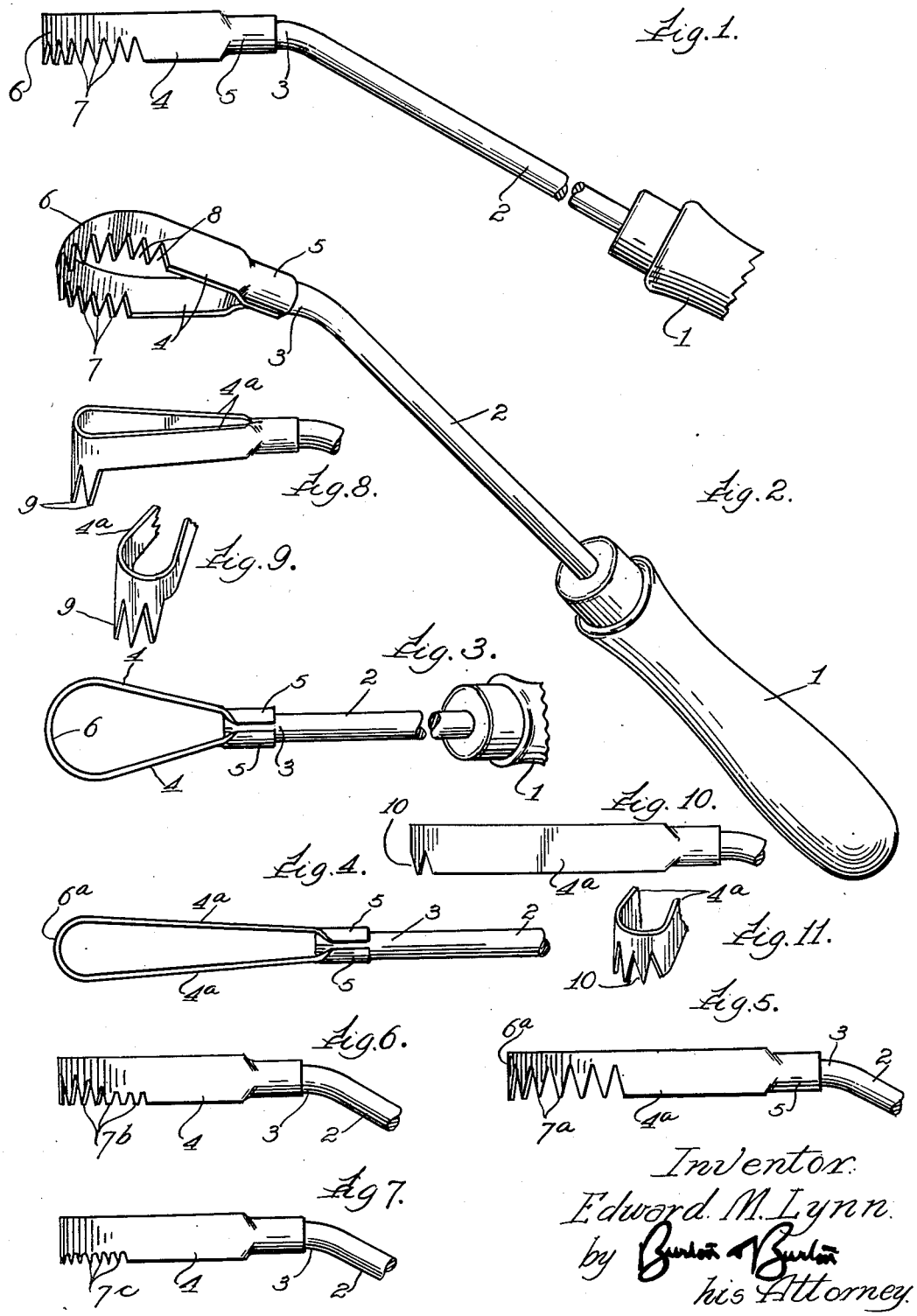

2,508,957

UNITED STATES PATENT OFFICE 2,508,957

EVISCERATING TOOL

Edward M. Lynn, Chicago, Ill.

Application November 11, 1944, Serial No. 562,973

8 Claims. (Cl. 17—11)

This invention relates to equipment for facilitating the work of cleaning or eviscerating poultry, and one object of the invention is to provide a new and improved tool for this purpose. Another object of the invention is to provide an eviscertaing tool which shall be simple to construct and to operate, and so designed that it may be readily cleansed. The invention also contemplates the provision of a series of similar tools made in various sizes and proportions to meet different specific needs as more particularly pointed out herein.

Other objects and advantages of the invention will appear from the following description taken in connection with the drawings in which, Fig. 1 is a side elevation showing an eviscerating tool embodying this invention with a portion of the handle broken away and with a portion of the shank broken out to condense the view.

Fig. 2 is a perspective view of the tool shown in Fig. 1.

Fig. 3 is a top plan view of the same but with the handle partly broken away and with a portion of the shank broken out.

Fig. 4 is a top plan view of the loop and a portion of the shank of a similar tool made with a relatively narrow loop.

Fig. 5 is a side elevation of the same.

Figs. 6 and 7 are side elevations of the loops and adajcent portions of the shanks of similar tools differing mainly in the size and arrangement of their teeth.

Figs. 8 and 9 are fragmentary, perspective, side and end views showing another arrangement of the teeth; and Figs. 10 and 11 illustrate a further modification of the number of the teeth.

While there are shown and described herein certain specific structures embodying the invention, it will be manifest to those skilled in the art that various modifications and rearrangements of the parts may be made without departing from the spirit and scope of the invention, and that the same is not limited to the particular form herein shown and described, except in so far as indicated by the appended claims.

In the preparation of chickens, turkeys and other poultry for market, particularly where this work is done on a large scale, the principle of the production line is usually employed and birds are carried upon or suspended from a traveling belt moving over an extended work table. Workers standing at successive stations are assigned to various tasks which include the removal of internal organs or viscera. Heretofore, the removal of the lungs and kidneys has involved some difficulty often resulting in slowing up of the entire process, but the present invention provides a tool which simplifies and facilitates this operation, and has increased production by as much as fifty percent.

Figs. 1, 2 and 3 illustrate a lung remover which includes a handle 1 and a shank 2 extending therefrom in substantial alignment with the axis of the handle, and having a terminal portion 3 which is bent at an obtuse angle to the main portion of the shank. A loop 4 of flat strip material is attached to the bent terminal portion 3 of the shank, and when the shank is made of round stock, as illustrated herein, the ends of the loop are shaped at 5, 5 to fit snugly over and embrace the portion 3 of the shank. The loop is rigidly secured to the shank, preferably by welding the portions 5, 5 thereto. In the lung remover the curved portion 6 of the loop is substantially semi-circular with straight portions connecting it to the terminals 5, 5 and at one edge of the curved portion 6 the strip is provided with teeth 7 which are employed to rapidly loosen and cut the membranes or tissues by which the lungs are held in the chest cavity of the chicken or other foul so that each lung is removed substantially with a single motion in the nature of a raking movement toward the operator. As shown, the teeth 7 point away from the plane of the loop at the side thereof which is opposite the projected axis of the main portion of the shank 2 so that the points of the teeth 7 lie in a plane disposed at an obtuse angle to the main axis of the shank 2.

For the removal of chicken lungs the loop 4 will be made of a convenient size to loosely encircle the lung, and for use in cleaning turkeys the loop 4 will be made somewhat larger to correspond with the larger dimensions of the turkey lung. The size of the teeth 7 may be varied somewhat to suit the preferences of individual operators, but the proportions shown in Figs. 1, 2 and 3 have been found entirely satisfactory and efficient. As shown, these teeth are formed by cutting a series of consecutive V-shaped notches 8 in the edge of the flat stock of which the loop 4 is formed, and the inclined sides of these notches 8 intersect to form the points of the teeth 7 which are composed of the material left standing between the notches. Preferably, to secure efficient cutting edges without a special sharpening operation, the formation of the teeth 7 is accomplished by a milling operation with a plurality of strips clamped face to face in upstanding position on the table of a milling machine and fed past a suitable cutter or cutters which form the notches 8 with the consequent formation of the teeth 7.

For the removal of the kidneys the loop of the tool should be narrow in proportion to its length somewhat as shown in Figs. 4 and 5 so that the curved portion 6$^a$ is formed with a smaller radius than the curved portion 6 of the lung remover. This curved portion is connected by straight sides 4$^a$, 4$^a$ to terminal portions 5, 5 which may be exactly similar to the terminals of the lung remover and which may be secured as by welding to the terminal portion of the shank. In most foul the kidneys are located in grooves or channels at either side of the backbone which makes it desirable to form the kidney removing loop with a smaller radius than the loop of the lung remover so that it may travel rather closely in this channel for efficiently disengaging the kidney with a single raking movement. In the kidney remover as in the lung remover the plane of the loop is obtuse to the main portion 2 of the shank, and the angle between these parts may be the same for both tools. Understanding that the tool shown in Figs. 1, 2 and 3 is suitable as a chicken lung remover it will be evident that the tool shown in Figs. 4 and 5 designed as a kidney remover is proportionately adapted to a larger foul such as a turkey and that the kidney remover for a chicken would be smaller.

The teeth 7 and the teeth 7$^a$ may be substantially similar in shape and arrangement but the size and shape of the teeth is not extremely critical as indicated by Figs. 6 and 7 which illustrate the forms of teeth 7$^b$ and 7$^c$ respectively, all of which have proven satisfactory in operation. Figures 8 and 9 illustrate a structure having only three teeth but in which these teeth project below the lower edges of the side portions 4$^a$ of the loop. In the tool shown in Figs. 10 and 11, the teeth 10 are formed by notching the curved outer end of the loop, but they are limited to two in number. These variations in the size and number of teeth have all been made to meet the preferences of individual operators and have all proven satisfactory in service. But each of these styles includes the rounded end of the loop with its side members 4 or 4$^a$ extending smoothly back from the rounded end, thus providing a guard structure which permits the tool to be manipulated for its intended function and then easily withdrawn from the carcass without catching or snagging.

I claim as my invention:

1. An eviscerating tool comprising a handle, a relatively long, slender shank extending therefrom and a loop attached rigidly to said shank and disposed in a plane at an obtuse angle thereto and having teeth pointed away from the plane of the loop at the side opposite the projected axis of the shank.

2. An eviscerating tool comprising a handle, a relatively long, slender shank extending therefrom and a loop attached rigidly to said shank and disposed in a plane at an obtuse angle thereto, the portion of the loop remote from said shank having teeth pointing away from the plane of the loop at the side opposite the projected axis of the shank.

3. An eviscerating tool comprising a handle, a relatively long, slender shank extending therefrom in substantial alignment with the handle and having its outer end portion positioned at an obtuse angle to the remainder of the shank, a loop comprising a flat strip with its ends secured to said outer end portion of the shank whereby the loop is disposed in a plane at an obtuse angle to the main portion of the shank and to the handle, one edge of the strip having teeth pointing away from the plane of the loop at the side opposite the projected axis of the shank.

4. A tool as defined in claim 3, said shank being a round rod and said flat strip having its ends formed to embrace the shank and secured rigidly to said end portion thereof.

5. An eviscerating tool comprising a handle, a relatively long, slender shank extending therefrom and a loop attached rigidly to said shank and disposed in a plane at an obtuse angle thereto, said loop having V-shaped notches in one edge forming V-shaped teeth pointing away from the plane of the loop at the side thereof opposite the projected axis of the shank.

6. A lung remover for cleaning poultry, said remover comprising a handle, a relatively long, slender shank extending therefrom and a loop of flat stock secured rigidly to said shank and disposed in a plane at an obtuse angle thereto, said shank being long enough to support the loop in engagement with a lung of a fowl to be cleaned without entering the handle in the body of the fowl, said loop comprising a substantially semi-circular curved portion dimensioned to encircle the lung to be removed, with straight portions connecting the curved portion to the shank and having teeth in said curved portion pointing away from the plane of the loop at the side opposite the projected axis of the shank.

7. A kidney remover for cleaning poultry, said remover comprising a handle, a relatively long, slender shank extending therefrom and a relatively narrow, elongated loop attached rigidly to said shank in a plane at an obtuse angle thereto, said loop comprising a rounded end portion and straight portions extending therefrom secured to opposite sides of the shank respectively, the curved portion of the loop having teeth pointing away from the loop at the side opposite the projected axis of the shank.

8. A tool for cleaning poultry and comprising a handle, a relatively long, slender shank extending therefrom in substantial alignment with the handle and a loop formed of flat stock with its ends secured rigidly to the shank, said loop being disposed in a plane at an obtuse angle to the axis of the shank and handle and provided with teeth pointing away from the plane of the loop at the side opposite the projected axis of the shank, said loop including a substantially semi-circular portion remote from the shank with substantially straight portions extending therefrom convergently and secured to the shank.

EDWARD M. LYNN.

REFERENCES CITED

The following references are of record in the file of this patent:

UNITED STATES PATENTS

| Number | Name | Date |
| --- | --- | --- |
| 790,760 | Stuart | May 23, 1905 |
| 959,604 | Qua | May 31, 1910 |
| 1,421,397 | Bruch | July 4, 1922 |
| 1,601,382 | Tieman | Sept. 28, 1926 |
| 1,723,507 | Haertter | Aug. 6, 1929 |
| 1,749,178 | Berg | Mar. 4, 1930 |
| 1,785,531 | Roesch et al. | Dec. 16, 1930 |